(12) United States Patent
Rouleau et al.

(10) Patent No.: US 6,616,910 B2
(45) Date of Patent: *Sep. 9, 2003

(54) PROCESS FOR PREPARATION OF AN EUO-STRUCTURAL-TYPE ZEOLITE, THE ZEOLITE THAT IS OBTAINED AND ITS USE AS CATALYST FOR ISOMERIZATION OF C8-AROMATIC COMPOUNDS

(75) Inventors: Loïc Rouleau, Oullins (FR); Frédéric Kolenda, Chaponost (FR); Elisabeth Merlen, Rueil-Malmaison (FR); Fabio Alario, Neuilly sur Seine (FR)

(73) Assignee: Institut Francais du Petrole, Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/849,483

(22) Filed: May 7, 2001

(65) Prior Publication Data

US 2001/0051757 A1 Dec. 13, 2001

Related U.S. Application Data

(60) Provisional application No. 60/212,047, filed on Jun. 16, 2000.

(30) Foreign Application Priority Data

May 5, 2000 (FR) .............................. 00/05799

(51) Int. Cl.[7] .......................... C01B 39/04; C07C 5/22; B01J 29/06
(52) U.S. Cl. ..................... 423/706; 423/708; 423/709; 585/481; 502/64; 502/74
(58) Field of Search ................................ 423/705, 706, 423/709, 708; 502/73, 74, 64; 585/481, 482

(56) References Cited

U.S. PATENT DOCUMENTS

| | | | | |
|---|---|---|---|---|
| 4,640,829 A | * | 2/1987 | Rubin | ........................ 423/277 |
| 4,695,667 A | * | 9/1987 | Sumitani et al. | ............. 585/481 |
| 5,405,596 A | | 4/1995 | Moini et al. | ................. 423/705 |
| 6,342,200 B1 | * | 1/2002 | Rouleau et al. | ............. 423/708 |

FOREIGN PATENT DOCUMENTS

| | | |
|---|---|---|
| EP | 0 042 226 A1 | 12/1981 |
| EP | 0 159 845 A2 | 10/1985 |

OTHER PUBLICATIONS

Rao et al., "Synthesis and Characterization of High Silica EU–1, " Zeolites, vol. 9, Nov. 1989, pp. 483–390.*

Microporous Materials 4 (1995) 123–130, Molecular shape selectivity of EUO zeolites, Wim Souverijns et al.

Structure and location of the organic base in zeolite EU–1 by $^{13}C$ CP–MAS n.m.r., A. Thangaraj et al., Zeolites, 1991, vol. 11, pp. 69–72.

The Synthesis and Characterisation of Zeolite EU–1, J.L. Casci et al., Imperial Chemical Industries PLC, New Science Group, Middlesbrough, Cleveland, pp. 894–904.

* cited by examiner

Primary Examiner—David Sample
(74) Attorney, Agent, or Firm—Millen, White, Zelano, Branigan, P.C.

(57) ABSTRACT

This invention relates to a process for synthesis of an EUO-structural-type zeolite that comprises at least one element X that is selected from among silicon and germanium and at least one element T that is selected from among aluminum, iron, gallium, boron, titanium, vanadium, zirconium, molybdenum, arsenic, antimony, chromium and manganese, whereby said process is carried out in the presence of an organic structuring agent that is derived from dibenzyldimethylammonium (DBDMA) or its precursors and in the presence of nuclei of at least one zeolitic material of the same structure as the zeolite that is to be synthesized. The zeolite that is thus obtained has an X/T ratio of between 5 and 50. It is used in particular as a catalyst, for example in a process for isomerization of aromatic compounds with 8 carbon atoms per molecule.

31 Claims, No Drawings

PROCESS FOR PREPARATION OF AN EUO-STRUCTURAL-TYPE ZEOLITE, THE ZEOLITE THAT IS OBTAINED AND ITS USE AS CATALYST FOR ISOMERIZATION OF C8-AROMATIC COMPOUNDS

CROSS REFERENCE TO RELATED APPLICATIONS

This application claims the benefit under 35 U.S.C. 119(e) of provisional application No. 60/212,047 filed Jun. 16, 2000.

TECHNICAL FIELD

This invention relates to a process for preparation of an EUO-structural-type zeolite that contains, after synthesis, in its intracrystalline pores, a nitrogen-containing organic cation with a chemical formula that is defined and synthesized with nuclei to obtain a zeolite that has a well-determined chemical composition of its crystalline framework. The invention also relates to the zeolite that is prepared by this process and the use of said zeolite in a process for isomerization of aromatic compounds with 8 carbon atoms that are also called "C8-aromatic fractions" in the presence of a catalyst with an EUO zeolite base that is prepared according to the process of this invention.

PRIOR ART

The isomerization of xylenes of ethylbenzene or a mixture of xylenes and ethylbenzene requires the presence of an acid function and a metal of group VIII. The main purpose of the isomerization of the C8-aromatic fractions is to produce the paraxylene that is the most desired isomer because of its application particularly in the textile industry. The isomerization reaction of the C8-aromatic compounds leads to parasitic reactions that result from the opening of naphthene rings that may or may not be followed by cracking or else reactions of dismutation and/or transalkylation of the C8 aromatic compounds that generate undesirable aromatic compounds.

Catalysts for isomerization of aromatic compounds with 8 carbon atoms were already described. Patents U.S. Pat. Nos. 4,723,051 and 4,665,258 describe, for example, optimized formulations with a mordenite zeolite base and a metal of group VIII, but they result in catalysts with which the parasitic reactions are non-negligible. These catalysts lack selectivity of paraxylene in favor of the above-mentioned parasitic reactions that constitute net losses for the desired isomerization reaction.

Other works have shown that the EUO-structural-type zeolites have improved catalytic performance levels, in particular in terms of activity, when said zeolites are used as a catalyst in the isomerization reactions of C8-aromatic fractions. In particular, European Patent Application EP-A-0 923 987 of the applicant relates to catalysts that are prepared with an EUO-structural-type zeolite that has good dispersion and good mechanical resistance of the metal of group VIII and that provide good selectivities.

The EUO-structural-type zeolites are described in the prior art (W. M. Meier and D. H. Olson, "Atlas of Zeolites Structure Types," 4th Edition, 1996) and have a monodimensional microporous network, whose diameter of the pores is 4.1×5.7 Å (1 Å=1 angstrom=1.10$^{-10}$ m). N. A. Briscoe et al. taught that these monodimensional channels have lateral pockets with a depth of 8.1 Å and a diameter of 6.8×5.8 Å (zeolites, 8, 74, 1988).

The EUO-structural-type zeolites comprise the EU-1 zeolite, the TPZ-3 zeolite, and the ZSM-50 zeolite and generally have the following formula in anhydrous form: 0–100 $XO_2$: 0–10 $T_2O_3$: 0–20 $R_{2/n}O$: where R represents a cation of valence n, X represents silicon and/or germanium, T represents at least one element that is selected from among aluminum, iron, gallium, boron, titanium, vanadium, zirconium, molybdenum, arsenic, antimony, chromium and manganese.

In general, the methods for preparation of EUO-structural-type zeolites comprise the mixture in aqueous medium of a source of an element X, a source of an element T, a source of an alkaline metal and a nitrogen-containing organic compound that acts as a structuring agent.

The EU-1 zeolite, described in European Patent Application EP-A-0 042 226, is prepared by using as a structuring agent either the alkylated derivative of an α-ω diammonium polymethylene or a degradation product of said derivative or else precursors of said derivative, whereby the structuring agent is found after synthesis in the intracrystalline pores of said zeolite (A. Moini et al, Zeolites, 14, 1994). This application also describes a synthesis process in which the zeolitic nuclei of the same nature or of a different nature from the EU-1 zeolite to be synthesized are introduced into the reaction mixture. This EU-1 zeolite preferably has an X/T ratio of between 5 and 75.

The TPZ-3 zeolite, described in European Patent Application EP-A-0 051 318, is prepared by using the same structuring agent family as the one that is employed for synthesizing the EU-1 zeolite. In particular, the use of the compound 1,6-N,N,N,N',N',N'-hexamethylhexamethylene diammonium is described. The synthesis of the TPZ-3 is optionally carried out in the presence of TPZ-3 zeolite nuclei. This TPZ-3 zeolite preferably has an X/T ratio of between 10 and 125.

The ZSM-50 zeolite, described in documents EP-A-0 159 845 and U.S. Pat. No. 4,640,829, is prepared by using as a structuring agent the dibenzyldimethylammonium derivative (DBDMA) that is contained in the intracrystalline pores of said zeolite (A. Thangaraj et al., Zeolites, 11, 1991).

The synthesis methods of EUO-structural-type zeolites differ essentially by the nature of the organic structuring agent and the natures of the nuclei, when the mixture contains them, as well as by the chemical composition of the mixture (X/T ratio).

Thus, an EUO zeolite that is obtained in a process of preparation that uses the DBDMA derivative is distinguished essentially, after synthesis, from the EUO zeolites that are obtained in a synthesis process with the α-ω diammonium polymethylene compounds, by the nature of the cation that is present in the intracrystalline pores. It is also described in the literature that the structure of an EUO zeolite, obtained with DBDMA, differs from that of an EUO zeolite that is obtained with the αω diammonium polymethylene compounds by the arrangement of aluminum atoms within the crystalline network (W. Sowerijns et al, *Microporoups Materials*, 4, 123–130 (1995)).

Whereas the family of structuring agents used for synthesizing the EU-1 and TPZ-3 zeolites seems to promote obtaining zeolites with a low Si/Al ratio, structuring agents such as the DBDMA promote obtaining zeolites with a high Si/Al ratio. Thus, Patent U.S. Pat. No. 4,640,829 describes a method for preparation of a zeolite that has an Si/Al ratio that is greater than 125 and teaches that DBDMA is particularly effective for promoting nucleation and the growth of crystals of ZSM-50 zeolites that have a high Si/Al ratio.

It is also reported that with an Si/Al ratio that is less than 125, the product that is obtained for the most part does not contain the ZSM-50 zeolite. Likewise, Rao et al. (Zeolites, 9, 483–490, 1989) described the synthesis of an EUO-structural-type zeolite with a mixture of benzyldimethylammonium and benzyl chloride, whereby the zeolite that is obtained has a crystallinity rate that is better, the higher the Si/Al ratio. Rao further teaches that for numerous catalytic applications, it is preferable to use zeolites that have a high Si/Al ratio.

SUMMARY OF THE INVENTION

This invention is based on the discovery of a process for preparation of an EUO-structural-type zeolite that is synthesized in the presence of a nitrogen-containing organic structuring agent of the dibenzyldimethylammonium (DBDMA) type and that has an X/T ratio of between 5 and 50 where X is selected from among silicon and germanium and T is selected from among aluminum, iron, gallium, boron, titanium, vanadium, zirconium, molybdenum, arsenic, antimony, chromium and manganese. The preparation of the zeolite is carried out in the presence of nuclei of at least one zeolitic material of the same structural type as the zeolite to be synthesized and, preferably, of a chemical composition of the crystalline framework that is close to that of the zeolite that is to be synthesized. The zeolite that is obtained by this process according to the invention is a new EUO-structural-type zeolite that has an Si/Al ratio of between 5 and 50, preferably between 6 and 35, more preferably between 7 and 30 and even more preferably between 7 and 26. It is differentiated from EU-1 and TPZ-3 zeolites in that it contains, after synthesis, organic cation DBDMA, and it is differentiated from the ZSM-50 zeolite by its low Si/Al ratio. The invention also relates to the use of said zeolite as an element of a catalyst that is used in the processes for transformation of hydrocarbons and in particular in the processes for isomerization of C8-aromatic compounds.

ADVANTAGE OF THE INVENTION

The process of preparation of the invention that is carried out in the presence of a structuring agent that is derived from dibenzyldimethylammonium (DBDMA) and nuclei makes it possible to obtain, surprisingly enough, a new EUO-structural-type zeolite with a low Si/Al ratio and with a maximum yield of pure product and an optimum crystallization period.

The EUO-structural-type zeolite that is prepared according to the process of the invention and used as a catalyst, combined with at least one binder, at least one metal that is selected from among the elements of group VIII, whereby said metal is preferably deposited on the binder, has improved catalytic performance levels in transformation of hydrocarbons in terms of activity, such as, for example, in isomerization of C8-aromatic fractions, i.e., mixtures that consist of xylenes and optionally ethylbenzene. In particular, it was discovered, surprisingly enough, that an EUO-structural-type zeolite that is synthesized with DBDMA and that has an Si/Al ratio that is less than 50, results in a more active and more selective catalyst than those with an EUO zeolite base that are also synthesized with DBDMA but that have an Si/Al ratio that is greater than 50. A catalyst with an EUO zeolite base that is prepared according to the process of the invention also makes it possible to reduce the net losses constituted by the secondary products that are formed by the secondary reactions.

DESCRIPTION OF THE INVENTION

This invention relates to a process for synthesis of an EUO-structural-type zeolite that comprises at least one element X that is selected from among silicon and germanium and at least one element T that is selected from among aluminum, iron, gallium, boron, titanium, vanadium, zirconium, molybdenum, arsenic, antimony, chromium and manganese, whereby said process is carried out in the presence of an organic structuring agent that is derived from dibenzyldimethylammonium (DBDMA) or its precursors and in the presence of nuclei of at least one zeolitic material of the same structure as the zeolite that is to be synthesized so as to obtain an EUO zeolite that has an X/T ratio of between 5 and 50, preferably between 6 and 35, more preferably between 7 and 30 and even more preferably between 7 and 26.

The zeolite that is prepared according to the process of the invention contains, after synthesis and before calcination and/or ion exchange, the DBDMA cation in its intracrystalline pores.

The synthesis process according to the invention comprises the mixture in aqueous medium of at least one source of at least one element X that is selected from among silicon and germanium, at least one source of at least one element T that is selected from among aluminum, iron, gallium, boron, titanium, vanadium, zirconium, molybdenum, arsenic, antimony, chromium and manganese, at least one nitrogen-containing organic compound Q that is selected from among the derivatives of dibenzyldimethylammonium and the precursors corresponding to said derivatives, and nuclei S of at least one EUO-structural-type zeolitic material.

Advantageously, the EUO-structural-type zeolitic nuclei have an X/T ratio of between 5 and 100, where X and T are defined as above. Very preferably, the zeolite that is to be prepared and the zeolitic nuclei that are used during the preparation process comprise the same elements X and T.

The X/T ratio of said nuclei is preferably between 5 and 50. More preferably, it is between 6 and 35, and even more preferably it is between 7 and 30. Very preferably, the nuclei have the same crystalline composition as that of the EUO zeolite that is to be prepared, i.e., they have the same Si/Al ratio as that of the zeolite that is prepared.

Organic structuring agent Q can be a dibenzyldimethylammonium salt, such as, for example, halide, hydroxide, sulfate, silicate or aluminate.

The dibenzyldimethylammonium salts can be obtained from precursors. Particularly suitable precursors are benzyldimethylamine and benzyl halide or benzyl alcohol. They can be used just as they are in situ or they can be preheated together in the reaction container, preferably in solution before the addition of the other reagents that are necessary for the synthesis of the EUO-structural-type zeolite.

The zeolitic materials that act as nuclei can be introduced during the process of the invention under several forms. Thus, the nuclei can be introduced after having undergone at least one of the stages that is selected from among the following stages: washing, drying, calcination and ion exchange. The nuclei can also be introduced in the crude synthesis form.

The zeolitic materials that act as nuclei can be introduced at any time in the preparation process of the zeolite that it is desired to synthesize. The nuclei can be introduced at the same time as the sources of elements X and T. organic structuring agent Q, or the nuclei can be introduced first into the aqueous mixture or else the nuclei can be introduced after the introduction of the sources of elements X and T and the structuring agent. The nuclei are preferably introduced after homogenization at least in part from the aqueous mixture that contains the sources of elements X and T and said organic structuring agent.

Whereby the size of the particles of zeolitic nuclei can have an influence on the synthesis process, it is suitable to select the nuclei that have a particle size such that the synthesis conditions are optimum. Zeolitic nuclei particle is defined as either a zeolite crystal or an aggregate of zeolite crystals where an aggregate is a unit that is formed by at least two zeolite crystals that have at least one contact point between them. Thus, at least the majority (i.e., at least 90% by volume) of the particles of nuclei that are introduced during the preparation of the EUO zeolite have a size of between 0.001 and 500 $\mu$m, preferably between 0.005 and 250 $\mu$m and even more preferably between 0.005 and 200 $\mu$m.

In a particular implementation that may or may not be independent of the preceding implementation, it is advantageous to add to the reaction medium at least one alkaline metal salt or ammonium salt P. It is possible to cite, for example, strong acid radicals such as bromide, chloride, iodide, sulfate, phosphate or nitrate, or weak acid radicals such as organic acid radicals, for example citrate or acetate. This salt can accelerate the crystallization of the EUO-structural-type zeolite starting from the reaction mixture.

In the preparation process according to the invention, the reaction mixture has the following composition, expressed in oxide form:

| | |
|---|---|
| $XO_2/T_2O_3$ (mol/mol) | 10–100 |
| $OH^-/XO_2$ (mol/mol) | 0.002 to 2.0 |
| $Q/XO_2$ (mol/mol) | 0.002 to 2.0 |
| $Q/(M^+ + Q)$ (mol/mol) | 0.1 to 1.0 |
| $H_2O/XO_2$ (mol/mol) | 1 to 500 |
| $P/XO_2$ (mol/mol) | 0 to 5 |
| $S/XO_2$ (g/g) | 0.0001 to 0.1 | preferably, the reaction mixture has the following composition, expressed in oxide form:

| | |
|---|---|
| $XO_2/T_2O_3$ (mol/mol) | 12–70 |
| $OH^-/XO_2$ (mol/mol) | 0.005 to 1.5 |
| $Q/XO_2$ (mol/mol) | 0.005 to 1.5 |
| $Q/(M^+ + Q)$ (mol/mol) | 0.1 to 1.0 |
| $H_2O/XO_2$ (mol/mol) | 3 to 250 |
| $P/XO_2$ (mol/mol) | 0 to 1 |
| $s/XO_2$ (g/g) | 0.0005 to 0.07 | and, even more preferably, the reaction mixture has the following composition, expressed in oxide form:

| | |
|---|---|
| $XO_2/T_2O_3$ (mol/mol) | 15–60 |
| $OH/XO_2$ (mol/mol) | 0.01 to 1 |
| $Q/XO_2$ (mol/mol) | 0.01 to 1 |
| $Q/(M^+ + Q)$ (mol/mol) | 0.1 to 1.0 |
| $H_2O/XO_2$ (mol/mol) | 5 to 100 |
| $P/XO_2$ (mol/mol) | 0 to 0.25 |
| $S/XO_2$ (g/g) | 0.001 to 0.04 | where
- X is silicon and/or germanium,
- T is at least one element that is selected from among aluminum, iron, gallium, boron, titanium, vanadium, zirconium, molybdenum, arsenic, antimony, chromium and manganese,
- $M^+$ represents an alkaline metal or ammonium ion,
- Q represents the organic structuring agent or the precursors of said structuring agent,
- S represents the zeolite nuclei that are present in crude, dried, calcined or exchanged form,
- P represents the alkaline metal salt or ammonium salt.

The zeolite that is prepared by the process of the invention has an X/T ratio of between 5 and 50, preferably between 6 and 35, preferably between 7 and 30 and even more preferably between 7 and 26.

M and/or Q can be present in the form of hydroxides or salts of inorganic or organic acids provided that the $OH^-/XO_2$ criterion is satisfied.

The amount of organic structuring agent relative to the amount of oxide $XO_2$ is between 0.002 and 2, and preferably between 0.005 and 1.5, and even more preferably between 0.01 and 1.

The amount of nuclei introduced relative to the amount of oxide $XO_2$ is between 0.01 and 10%, and preferably between 0.05 and 7% and even more preferably between 0.1 and 4%.

The preferred alkaline metal ($M^+$) is sodium. Preferred element X is silicon. Preferred element T is aluminum.

The silicon source can be any one of those whose use is usually considered for the synthesis of zeolites, for example powdered solid silica, silicic acid, colloidal silica or silica in solution. Among the powder silicas that can be used, it is suitable to cite the precipitated silicas, especially those that are obtained by precipitation starting from a solution of an alkaline metal silicate, such as the "Zeosil" or the "Tixosil," produced by Rhodia, the pyrogenated silicas such as the "Aerosil" produced by Degussa and the "Cabosil" produced by Cabot and the silica gels. Colloidal silicas of various grain sizes can be used, such as those sold under the filed trademarks "LUDOX" of Dupont and "SYTON" of Monsanto. The dissolved silicas that can be used are in particular soluble glasses or marketed silicates that contain: 0.5 to 6.0 and especially 2.0 to 4.0 mol of $SiO_2$ per mol of alkaline metal oxide and the silicates that are obtained by dissolution of silica in an alkaline metal hydroxide, a quaternary ammonium hydroxide or a mixture of the latter.

The aluminum source is most advantageously sodium aluminate, but it can also be aluminum, an aluminum salt, for example chloride, nitrate or sulfate, an aluminum alcoholate or the alumina itself, which is preferably in a hydrated or hydratable form such as colloidal alumina, pseudoboehmite, boehmite, gamma-alumina or the trihydrates.

It is possible to use mixtures of the sources that are cited above. Combined sources of silicon and aluminum can also be used, such as the amorphous silica-aluminas or certain clays.

The reaction mixture is usually caused to react under autogenic pressure, optionally with the addition of a gas, for example, nitrogen, at a temperature of between 85 and 250° C. until crystals of the zeolite form, which can last from 1 minute to several months according to the composition of the reagents, the method of heating and mixing, the working temperature and the stirring. The stirring is optional, but preferable, because it shortens the reaction time.

At the end of the reaction, the solid phase is collected on a filter and washed. In that stage, the EUO zeolite that is obtained according to the process of the invention is called raw straight from synthesis and contains in its intracrystalline pores the DBDMA cation. The zeolite is then ready for the following operations such as drying, calcination and ion exchange.

Thus, to obtain the hydrogen form of the EUO-structural-type zeolite, it is possible to carry out an ion exchange with an acid, especially a strong mineral acid such as hydrochloric acid, sulfuric acid or nitric acid, or with a compound such as ammonium chloride, ammonium sulfate or ammonium nitrate. The ion exchange can be carried out by dilution in one or more steps with the ion exchange solution. The zeolite can be calcined before or after the ion exchange or between two ion exchange stages, preferably before the ion exchange to eliminate any included organic substance to the extent that the ion exchange is facilitated.

Generally, the cation or cations of the EUO-structural-type zeolite can be replaced by one or more of any metal cations and in particular those of groups IA, IB, IIA, IIB, IIIA, IIIB (including the rare earths), VIII (including the noble metals), just as for lead, tin and bismuth (periodic table in "Handbook of Physics and Chemistry," 76th Edition). The exchange is carried out with any water-soluble salts that contain the suitable cation.

This invention also relates to the use of the EUO zeolite as prepared according to the process of this invention as an acid solid for catalysis in the fields of refining and petrochemistry, i.e., the crude synthesis zeolite was calcined and exchanged. It can also be used as an adsorbent for monitoring pollution and as a molecular sieve for the separation. Advantageously, it is used as nuclei for the synthesis of zeolites of any structural type. When it is used as nuclei, it can be found both in its crude synthesis form and in its calcined form or in its exchanged form.

For example, when the EUO-structure zeolite, prepared according to the process of the invention, is used as a catalyst, it is calcined and exchanged and can be combined with an inorganic matrix that can be inert or catalytically active and with a metallic phase. The inorganic matrix can be present simply as a binder to keep together the small particles of the zeolite in the various known forms of catalysts (extrudates, pellets, balls, powders) or else can be added as a diluent for imposing the degree of conversion into a process that would otherwise proceed at too quick a rate, leading to fouling of the catalyst due to excessive coke formation. Typical inorganic matrices are in particular substrate materials for the catalysts such as silica, various forms of alumina, magnesia, zirconia, titanium oxides, boron oxides, aluminum phosphates, titanium phosphates, zirconium phosphates, kaolinic clays, bentonites, montmorillonites, sepiolite, attapulgite, fuller's earth, synthetic porous materials such as $SiO_3$—$Al_2O_3$, $SiO_2$—$ZrO_2$, $SiO_2$—$ThO_2$, $SiO_2$—$BeO$, $SiO_2$—$TiO_2$ or any combination of these compounds.

The EUO-structural-type zeolite that is prepared according to the process of the invention can also be combined with at least one other zeolite and can act as the main active phase or additive.

The inorganic matrix can be a mixture of various compounds, in particular an inert phase and an active phase.

The metallic phase is introduced into only the zeolite, only the inorganic matrix or the inorganic matrix-zeolite unit by ion exchange or impregnation with cations or oxides that are selected from among the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element of the periodic table.

The catalytic compositions that comprise the EUO-structural-type zeolite that is prepared according to the process of the invention are generally suitable for the use of the main processes for transformation of hydrocarbons and synthesis reactions of organic compounds such as ethers.

The catalytic compositions that comprise the EUO-structural-type zeolite, prepared according to the process of the invention, can be applied advantageously in the reactions of isomerization, transalkylation and dismutation, alkylation and dealkylation, hydration and dehydration, oligomerization and polymerization, cyclization, aromatization, cracking and hydrocracking, reforming, hydrogenation and dehydrogenation, oxidation, halogenation, amine syntheses, hydrodesulfurization and hydrodenitrification, catalytic elimination of nitrogen oxides, whereby said reactions comprise saturated and unsaturated aliphatic hydrocarbons, aromatic hydrocarbons, oxidized organic compounds and organic compounds that contain nitrogen and/or sulfur, as well as organic compounds that contain other functional groups.

When said EUO zeolite is used as an acid solid in catalytic reactions, the catalyst contains:

at least one EUO-structural-type zeolite that is synthesized in the presence of a DBDMA-type structuring agent and nuclei of EUO-structural-type zeolitic material according to the process that is described above, whereby said zeolite comes at least in part in acid form, i.e., in hydrogen H form, at least one metal of group VIII, preferably selected from the group that consists of palladium and platinum and even more preferably platinum, at least one binder, preferably alumina, optionally at least one element that belongs to the group that is formed by the elements of groups IB, IIB, IIIA, IVA, VIB and VIIB, preferably selected from the group that is formed by tin and indium, optionally sulfur.

More specifically and relative to the weight of the catalyst, the catalyst generally comprises:

1 to 90% inclusive, preferably 3 to 75% inclusive, and even more preferably 4 to 60% inclusive by weight, of at least one EUO-structural-type zeolite, prepared according to the process of the invention, comprising at least one element X that is selected from among germanium and silicon and at least one element T that is selected from the group that is formed by aluminum, iron, gallium, boron, titanium, vanadium, zirconium, molybdenum, arsenic, antimony, chromium and manganese, preferably aluminum and boron, whose X/T atomic ratio is between 5 and 50, preferably between 6 and 35, more preferably between 7 and 30 and even more preferably between 7 and 26, whereby said zeolite comes at least in part in acid form, i.e., in hydrogen H form, 0.01 to 10% inclusive, preferably 0.01 to 2% inclusive, and even more preferably 0.05 to 1.0% inclusive by weight, of at least one metal of group VIII of the periodic table, preferably selected from the group that is formed by platinum and palladium and even more preferably platinum, optionally 0.01 to 10% inclusive, preferably 0.01 to 2% inclusive, and even more preferably between 0.05 and 1.0% inclusive by weight, of at least one element of the group that is formed by groups IB, IIB, IIIA, IVA, VIB, and VIIB of the periodic table, preferably selected from the group that is formed by tin and indium, optionally sulfur, whose content is such that the ratio of the number of sulfur atoms to the number of metal atoms of group VIII that are deposited is between 0.5 and 2 inclusive, the make-up to 100% by weight of at least one binder, preferably alumina.

Any shaping method is suitable for this catalyst. It is possible to use, for example, pelletizing, extrusion or the shaping of balls. The shaping of the catalyst according to the invention is generally such that the catalyst is preferably in the form of extrudates or balls with a view to its use.

The EUO-structural-type zeolite, prepared according to the process of the invention, is treated by at least one calcination stage, then subjected to at least one ion exchange in at least one $NH_4NO_3$ solution to obtain a zeolite whose content of residual alkaline element A, for example sodium, is more or less significant.

The EUO-structural-type zeolite, prepared according to the process of the invention and included in the catalytic compositions, is at least partly, preferably virtually completely, in acid form, i.e., in hydrogen form ($H^+$), whereby the content of alkaline element, for example sodium, is preferably such that the A/T atomic ratio is less than 0.5, preferably less than 0.1, even more preferably less than 0.02.

The binder (or matrix) in the catalyst with the EUO zeolite base that is prepared according to the process of the invention generally consists of at least one element that is selected from the group that is formed by clays, magnesia, aluminas, silicas, titanium oxide, boron oxide, zirconia, aluminum phosphates, titanium phosphates, zirconium phosphates and silica-aluminas. The binder is preferably an alumina.

The metals can be introduced either all the same way or by different techniques, at any time of the preparation, before or after shaping and in any order. In addition, intermediate treatments, such as, for example, a calcination and/or a reduction, can be applied between the depositions of various metals.

The preparation of the catalyst can be carried out by any method that is known to one skilled in the art. At least one element of group VIII is introduced into the zeolite or in the binder, preferably in the binder, before or after shaping.

A preferred method consists in producing a mixture of the matrix and the zeolite followed by a shaping. The shaping is generally followed by a calcination, generally at a temperature of between 250° C. and 600° C., inclusive. At least one element of group VIII of the periodic table is introduced after this calcination, preferably by selective deposition on the binder. Said elements are deposited virtually at more than 90% inclusive entirely on the binder in a manner that is known to one skilled in the art by monitoring the parameters that are used during said deposition, such as, for example, the nature of the precursor that is used for carrying out said deposition.

At least one element of group VIII is deposited preferably in the EUO-binder zeolite mixture first shaped by any process that is known to one skilled in the art. Such a deposition is carried out, for example, by the dry impregnation technique, impregnation by excess or ion exchange. All of the precursors are suitable for the deposition of these elements. Preferably, an anion exchange will be used with the hexachloroplatinic acid and/or the hexachloropalladic acid in the presence of a competing agent, for example hydrochloric acid. In this case, the metal is virtually entirely deposited at more than 90% on the binder, and it has good dispersion and good macroscopic distribution through the catalyst grain which constitutes a preferred method of preparation.

More specifically, a preferred method for preparation of the catalyst, used in this invention, consists in kneading the EUO-zeolite, prepared according to the process of the invention, in a moist matrix gel (generally obtained by mixing at least one acid and a matrix powder), for example, alumina, for a period that is necessary for obtaining good homogeneity of the paste that is thus obtained, or, for example, for about 10 minutes, then in passing the paste through a die to form extrudates. Then, after drying, for example for several hours at about 120° C. in a drying oven and after calcination, for example for two hours at about 500° C., at least one element, for example platinum, is deposited, for example by anion exchange with the hexachloroplatinic acid in the presence of a competing agent (for example hydrochloric acid), whereby said deposition is followed by calcination for example for about 2 hours at about 500° C.

Optionally, at least one other element that is selected from the group that is formed by the elements of groups IB, IIB, IIIA, IVA, VIB and VIIB is added. It is possible to add the elements of group VIII and groups IB, IIB, IIIA, IVA, VIB and VIIB either separately at any stage of the preparation of said catalyst or simultaneously in at least one unit stage. When at least one element of groups IB, IIB, IIIA, IVA, VIB and VIIB is added separately, it is advantageous to add it first to the element of group VIII. All of the deposition techniques that are known to one skilled in the art and all of the precursors are suitable.

The platinum is generally introduced into the matrix in the form of hexachloroplatinic acid, but for any noble metal, ammoniated compounds with, in this case deposition of the noble metal in the zeolite, can also be used or compounds such as, for example, ammonium chloroplatinate, dicarbonyl platinum dichloride, hexahydroxyplatinic acid, palladium chloride, and palladium nitrate can be used.

In the case of platinum, it is also possible to cite, for example, tetraamine platinum II salts of formula $Pt(NH_3)_4X_2$; hexamine platinum IV salts of formula $Pt(NH_3)_6X_4$; the halogenopentamine platinum IV salts of formula $(PtX(NH_3)_5)X_3$; the tetrahalogenodiamine platinum IV salts of formula $PtX_4(NH_3)_2$; the platinum complexes with the halogen-polyketones and the halogenated compounds of formula $H(Pt(acac)_2X)$; whereby X is a halogen that is selected from the group that is formed by chlorine, fluorine, bromine and iodine, and whereby X is preferably chlorine and acac represents the group $C_5H_7O_2$ that is derived from acetylacetone.

The introduction of the noble metal of the platinum family is preferably carried out by impregnation with an aqueous or organic solution of one of the organometallic compounds that are cited above. Among the organic solvents that can be used, it is possible to cite the paraffinic, naphthenic or aromatic hydrocarbons that contain 4 to 12 carbon atoms, and the halogenated organic compounds that have, for example, 1 to 12 carbon atoms per molecule. It is possible to cite, for example, the n-heptane, methylcyclohexane, toluene and chloroform. It is also possible to use the mixtures of solvents.

The additional element, optionally introduced and selected from the group that is formed by the elements of groups IB, IIB, IIIA, IVA, VIB and VIIB, can be introduced by compounds such as, for example, chlorides, bromides and nitrates, alkyls of elements of groups IB, IIB, IIIA, IVA, VIB and VIIB, or, for example, in the case of tin and indium, alkyl-tin, nitrate and indium chloride.

This element can also be introduced in the form of at least one organic compound that is selected from the group that consists of the complexes of said element, in particular the polyketonic complexes of the metal and hydrocarbyl metals, such as the alkyls, cycloalkyls, aryls, and metal alkylaryls. In the latter case, the introduction of the metal is advantageously carried out with a solution of the organometallic compound of said metal in an organic solvent. It is also possible to use organohalogenated compounds of the metal. As compounds of the metal, it is possible to cite in particular tetrabutyltin in the case of tin, and triphenylindium in the case of indium.

The impregnation solvent is selected from the group that consists of the paraffinic, naphthenic or aromatic hydrocarbons that contain 4 to 12 carbon atoms per molecule and the halogenated organic compounds that contain 1 to 12 carbon atoms per molecule. It is possible to cite, for example, the n-heptane, methylcyclohexane and chloroform. It is also possible to use mixtures of the solvents that are defined above.

The additional metal can optionally be introduced at any time in the preparation, preferably prior to the deposition of one or more metals of group VIII. If this metal is introduced before the noble metal, the compound of the metal that is used is generally selected from the group that consists of halide, nitrate, acetate, tartrate, carbonate and oxalate of metal. The introduction is then advantageously carried out in aqueous solution. It is also possible, however, to be introduced with a solution of an organometallic compound of the metal, for example, tetrabutyltin. In this case, before initiating the introduction of at least one noble metal, calcination under air is initiated.

The preparation of the catalyst generally comprises calcination, usually at a temperature of between about 250° C. and 600° C. inclusive, for a period of about 0.5 to 10 hours, preferably preceded by drying, for example in a drying oven, at a temperature of between the ambient temperature and 250° C., preferably between 40 and 200° C. Said drying stage is preferably conducted during the rise in temperature that is necessary for carrying out said calcination.

In the case where the catalyst of this invention contains sulfur, the sulfur is introduced in the calcined, shaped catalyst that contains the metal or metals cited above, either in-situ before the catalytic reaction, or ex-situ. The optional sulfurization occurs after the reduction. In the case of a sulfurization in situ, the reduction, if the catalyst was not first reduced, occurs before the sulfurization. In the case of a sulfurization ex-situ, the reduction and then the sulfurization are carried out. The sulfurization is carried out in the presence of hydrogen by using any sulfurizing agent that is well known to one skilled in the art, such as, for example, the dimethyl sulfide or the hydrogen sulfide. For example, the catalyst is treated with a feedstock that contains dimethyl sulfide in the presence of hydrogen, with a concentration such that the sulfur/metal atomic ratio is 1.5. The catalyst is then kept for about 3 hours at about 400° C. under hydrogen flow before the feedstock is injected.

The catalyst with an EUO zeolite base that is prepared according to the process of this invention is very advantageously used in the reactions for isomerization of a C8-aromatic fraction that comprises, for example, either a mixture of xylene(s) or ethylbenzene, or a mixture of xylene(s) and ethylbenzene. Said process is generally used according to the following operating conditions:

a temperature of between 300° C. and 500° C. inclusive, preferably between 320° C. and 450° C. inclusive and even more preferably between 340° C. and 430° C. inclusive, a partial hydrogen pressure of between 0.3 and 1.5 MPa inclusive, preferably between 0.4 and 1.2 MPa inclusive and even more preferably between 0.6 and 1.2 MPa inclusive, a total pressure of between 0.45 and 1.9 MPa inclusive, preferably between 0.6 and 1.5 MPa inclusive, a feed volumetric flow rate, expressed in kilograms of feedstock that is introduced per kilogram of catalyst and per hour, between 0.25 and 30 $h^{-1}$ inclusive, preferably between 1 and 25 $h^{-1}$ inclusive, and even more preferably between 2 and 15 $h^{-1}$ inclusive.

The invention is illustrated by the following examples.

EXAMPLE 1

For Comparison

Synthesis of an EUO zeolite with an Si/Al ratio of gel that is equal to 58 with dibenzyldimethylammonium precursors as an organic structuring agent, according to the prior art.

The synthesis conditions are defined in Table 1.

Solution A that consists of silicon and structuring agent precursors is prepared by diluting 3.530 g of benzyldimethylamine (Lancaster, 98%) and 3.260 g of benzyl chloride (Fluka, 99%) in 42.92 g of water then by adding 38.45 g of the colloidal silica sol (Ludox HS40, Dupont, 40% $SiO_2$). Then, 0.610 g of solid sodium hydroxide (Prolabo, 99%) and 0.496 g of solid sodium aluminate (Prolabo, 46% $Al_2O_3$, 33% $Na_2O$) are dissolved in 5.36 g of water to form solution B. Solution A is added into solution B while being stirred, then 5.36 g of water is added. It is mixed until homogenization occurs. The mixture that results is reacted in a 125 ml autoclave while being stirred for 3 days at 180° C. under autogenic pressure. After cooling, the product is filtered and it is washed with 100 ml of demineralized water, and then it is dried in a ventilated drying oven at 120° C.

TABLE 1

| Synthesis Conditions | |
|---|---|
| Formulation of the Gel | |
| $SiO_2$ (mol) | 60 |
| $Al_2O_3$ (mol) | 0.52 |
| $Na_2O$ (mol) | 3 |
| BDMA (mol) | 6 |
| BCl (mol) | 6 |
| $H_2O$ (mol) | 1000 |
| Crystallization Conditions | |
| Temperature (° C.) | 180 |
| Length of time (day) | 3 |

BDMA = benzyldimethylamine
BCl = benzyl chloride

The results of the x-ray diffraction, chemical analysis and spectroscopy by nuclear magnetic resonance of carbon 13 at the magic angle under crossed polarization are recorded in Table 2. This synthesis results in the pure EUO zeolite with reference crystallinity, an Si/Al ratio of 56, and that contains the DBDMA cation in its intracrystalline pores.

The yields of silicon and aluminum, i.e., the rate of transformation of silicon and aluminum from gel into zeolite, are maximum (respectively 93 and 99%).

TABLE 2

Characteristics of the Solid that is Obtained

X-Ray Diffraction

| | |
|---|---|
| Phase Identification | EUO |
| Crystallinity (%) | 100 (reference) |
| Chemical Analyses (Contents by Weight) | |
| $SiO_2$ (% by weight) | 84.9 |
| $Al_2O_3$ (% by weight) | 1.3 |
| $Na_2O$ (% by weight) | 0.17 |
| N (% by weight) | 0.56 |
| Loss due to fire (PAF) (%) | 13.5 |
| Nuclear Magnetic Resonance Spectroscopy of Carbon 13 at the Magic Angle under Crossed Polarization (Chemical Shifts) | |
| Identification of the Organic Compound Included in the Zeolite | DBDMA |
| —CH3 (ppm) | 47.5 |
| —CH2 (ppm) | 72.9 |
| C-aromatic compounds (ppm) | 130 (solid mass) |

This crude synthesis zeolite that contains the DBDMA cation and that has an Si/Al ratio of 56 is synthesized according to the prior art and represents the reference for the analyses and the catalytic evaluations.

EXAMPLE 2

Invention

Synthesis of an EUO zeolite with an Si/Al ratio of gel that is equal to 30 with the dibenzyldimethylammonium precursors as organic structuring agent, according to the invention.

The synthesis conditions are defined in Table 3.

Solution A that consists of silicon and structuring agent precursors is prepared by diluting 3.530 g of benzyldimethylamine (Lancaster, 98%) and 3.260 g of benzyl chloride (Lancaster, 99%) in 42.79 g of water then by adding 38.37 g of the colloidal silica sol (Ludox HS40, Dupont, 40% $SiO_2$). Then, 0.418 g of solid sodium hydroxide (Prolabo, 99%) and 0.945 g of solid sodium aluminate (Prolabo, 46% $Al_2O_3$, 33% $Na_2O$) are dissolved in 5.35 g of water to form solution B. Solution A is added to solution B while being stirred, then 5.35 g of water is added. It is mixed until homogenization occurs. Finally, 0.616 g of EUO zeolite nuclei, post synthesis, that contains sodium and the hexamethonium cation (1,6 trimethylammonium-hexane) is added. This zeolite is prepared with a gel with an Si/Al ratio of 30 starting from hexamethonium bromide as a structuring agent. The mixture that results is reacted in a 125 ml autoclave while being stirred for 9 days at 180° C. under autogenic pressure. After cooling, the product is filtered, and it is washed with 100 ml of demineralized water, and then it is dried in a ventilated drying oven at 120° C.

TABLE 3

Synthesis Conditions

Formulation of the Gel

| | |
|---|---|
| $SiO_2$ (mol) | 60 |
| $Al_2O_3$ (mol) | 1 |
| $Na_2O$ (mol) | 3 |
| BDMA (mol) | 6 |
| BCl (mol) | 6 |
| $H_2O$ (mol) | 1000 |
| $EUO/SiO_2$(g/g) | 0.04 |

TABLE 3-continued

Synthesis Conditions

Crystallization conditions

| | |
|---|---|
| Temperature (° C.) | 180 |
| Length of time (day) | 9 |

BDMA = benzyldimethylamine
BCl = benzyl chloride

The results of x-ray diffraction, chemical analysis and spectroscopy by nuclear magnetic resonance of carbon 13 at the magic angle under crossed polarization are recorded in Table 4. This synthesis results in the pure EUO zeolite with a crystallinity of 95% relative to the reference, an Si/Al ratio of 26, and it contains the DBDMA cation in its intracrystalline pores.

The yields of silicon and aluminum, i.e., the rate of transformation of silicon and aluminum from gel into zeolite, are maximum (respectively 87 and 99%).

TABLE 4

Characteristics of the Solid that is Obtained

X-Ray Diffraction

| | |
|---|---|
| Phase Identification | EUO |
| Crystallinity (%) | 95 |
| Chemical Analyses (Contents by Weight) | |
| $SiO_2$ (% by weight) | 82.2 |
| $Al_2O_3$ (% by weight) | 2.7 |
| $Na_2O$ (% by weight) | 0.54 |
| N (% by weight) | 0.59 |
| Loss due to fire (PAF) (%) | 14.2 |
| Nuclear Magnetic Resonance Spectroscopy of Carbon 13 at the Magic Angle under Crossed Polarization (Chemical Shifts) | |
| Identification of the Organic Compound Included in the Zeolite | DBDMA |
| —CH3 (ppm) | 48.0 |
| —CH2 (ppm) | 74.1 |
| C-aromatic compounds (ppm) | 130 (solid mass) |

This crude synthesis zeolite that contains the DBDMA catalyst and that has an Si/Al ratio of 26 is synthesized according to a synthesis method that illustrates this invention.

EXAMPLE 3

For Comparison

Synthesis of an EUO zeolite with an Si/Al ratio of gel that is equal to 30 with the dibenzyldimethylammonium precursors as organic structuring agent and in the absence of nuclei.

The synthesis conditions are defined in Table 5.

Solution A that consists of silicon and structuring agent precursors is prepared by diluting 3.530 g of benzyldimethylamine (Lancaster, 98%) and 3.260 g of benzyl chloride (Lancaster, 99%) in 42.79 g of water then by adding 38.37 g of the colloidal silica sol (Ludox HS40, Dupont, 40% $SiO_2$). Then, 0.418 9 of solid sodium hydroxide (Prolabo, 99%) and 0.945 g of solid sodium aluminate (Prolabo, 46% $Al_2O_3$, 33% $Na_2O$) are dissolved in 5.35 g of water to form solution B. Solution A is added to solution B while being stirred, then 5.35 g of water is added. It is mixed until homogenization occurs. The mixture that results is reacted in a 125 ml autoclave while being stirred for 9 days at 180° C.

under autogenic pressure. After cooling, the product is filtered, and it is washed with 100 ml of demineralized water, and then it is dried in a ventilated drying oven at 120° C.

TABLE 5

Synthesis Conditions

Formulation of the Gel

| | |
|---|---|
| SiO$_2$ (mol) | 60 |
| Al$_2$O$_3$ (mol) | 1 |
| Na$_2$O (mol) | 3 |
| BDMA (mol) | 6 |
| BCl (mol) | 6 |
| H$_2$O (mol) | 1000 |

BDMA = benzyldimethylamine
BCl = benzyl chloride
Crystallization conditions: 9 days; T = 180° C..

An analysis by x-ray diffraction that is carried out on the product that is obtained after 9 days of synthesis shows that the product is amorphous.

If the same synthesis method is implemented but the reaction time is extended to 14 days, the product, analyzed by x-ray diffraction, is also amorphous.

EXAMPLE 4
For Comparison
Preparation of Catalyst A Not in Accor

The first raw material used is the crude synthesis EUO zeolite of Example 1 that comprises DBDMA and that has an overall Si/Al atomic ratio that is equal to 56 and an Na$_2$O content by weight relative to the weight of dry EU-1 zeolite of 0.17%.

This EUO zeolite first undergoes a so-called dry calcination at 550° C. under air flow for 6 hours. Then, the solid that is obtained is subjected to three ions exchanges in a 10N NH$_4$NO$_3$ solution, at about 100° C. for 4 hours for each exchange.

At the end of these treatments, the EUO zeolite in NH$_4$ form has an overall Si/Al atomic ratio that is equal to 56, a content by weight of sodium relative to the dry EUO zeolite weight of 55 ppm. The zeolite is again dried then calcined to obtain the H form.

Catalyst A is obtained by mixing the EUO zeolite and an alumina on which 0.33% by weight of platinum was first deposited, whereby the two components are in the form of a powder with a grain size of between 125 and 315 μm.

The platinum is deposited on this extruded alumina by anionic exchange with hexachloroplatinic acid in the presence of a competing agent (hydrochloric acid). The moist alumina is then dried at 120° C. for 12 hours and calcined under dry air flow at the temperature of 500° C. for one hour. The metallic phase has a dispersion of 99% measured by oxygen chemisorption. The alumina is then ground.

Catalyst A consists of contents by weight of 60% of EUO zeolite in hydrogen form that has an Si/Al ratio of 56, 39.87% of alumina and 0.13% of platinum.

EXAMPLE 5
According to the Invention
Preparation of Catalyst B According to the Invention.

The raw material used is the crude synthesis EUO zeolite of Example 2 that comprises DBDMA and that has an overall Si/Al atomic ratio that is equal to 26, and a content by weight of Na$_2$O relative to the weight of dry EU-1 zeolite of 0.54%.

This EUO zeolite first undergoes a so-called dry calcination at 550° C. under air flow for 6 hours. Then, the solid that is obtained is subjected to three ion exchanges in a 10N NH$_4$NO$_3$ solution at about 100° C. for 4 hours for each exchange.

At the end of these treatments, the EUO zeolite in NH$_4$ form has an overall Si/Al atomic ratio that is equal to 26, a content by weight of sodium relative to the weight of dry EUO zeolite of 60 ppm. The zeolite is again dried then calcined to obtain the H form.

Catalyst B is obtained by mixing the EUO zeolite and an alumina on which 0.33% by weight of platinum (the same as the one used in the preceding example) was previously deposited, whereby the two components are in the form of a powder with a grain size of between 125 and 315 μm.

Catalyst B consists of contents by weight of 10% of EUO zeolite in hydrogen form that has an Si/Al ratio of 26, 89.7% of alumina and 0.3% of platinum.

EXAMPLE 6

Evaluation of the Catalytic Properties of Catalysts A and B in Isomerization of a C8-Aromatic Fraction.

The performance levels of catalysts A and B were evaluated in the isomerization of a C8-aromatic fraction that mainly contains meta-xylene, ortho-xylene and ethylbenzene on 5 g of powdered catalyst. The operating conditions are as follows:

temperature: 390° C., total pressure: 15 bar, (1 bar=0.1 MPa)

partial hydrogen pressure: 12 bar.

The catalysts are first treated with a feedstock that contains dimethyl disulfide (DMDS) in the presence of hydrogen with a concentration such that the sulfur/metal atomic ratio is 1.5. The catalyst is then maintained for 3 hours at 400° C. under a hydrogen flow, then the feedstock is injected.

The catalysts were compared in terms of activity (by paraxylene equilibrium approaches and by the conversions of the ethylbenzene) and in terms of selectivity by the iso-approach net losses at the equilibrium of paraxylene.

To calculate equilibrium approaches (AEQ), the paraxylene concentrations (% pX) are expressed relative to the three xylene isomers.

Equilibrium approaches (AEQ) are defined in the following manner:

pX AEQ (%)=100×(% pX$_{effluent}$−% pX$_{feedstock}$)/(% pX$_{equilibrium}$−% pX$_{feedstock}$)

Cracking losses (P1) are losses of AC8 in the form of paraffins (PAR) of C1 to C8:

P1(% by weight)=100×[(% PAR$_{effluent}$×weight of effluent)−(% PAR$_{feedstock}$×weight of feedstock)]/(% AC8$_{feedstock}$×weight of feedstock)

Losses by dismutation/transalkylation (P2) are AC8 losses in the form of naphthenes other than N8, toluene, benzene and C9+ aromatic compounds (OAN):

P2(% by weight)=100×[(% OAN$_{effluent}$×weight of effluent)−(% OAN$_{feedstock}$×weight of feedstock)]/(% AC8$_{feedstock}$×weight of feedstock)

The sum of losses P1 and P2 represents the net losses.

The evaluation of the two catalysts described lead to the results that are presented in Table 6.

TABLE 6

| Catalyst | A (Anomalous) | B (Consistent) |
|---|---|---|
| pX AEQ (%) | 90.7 | 90.5 |
| EB Conversion (%) | 39.3 | 40.1 |
| Net Losses (% by weight) | 4.55 | 3.36 |

According to the results of Table 6, it is noted that catalyst B according to the invention is much more active than anomalous catalyst A, since it results in operating iso-conditions at a pX AEQ that is equal to the one that is obtained for catalyst A but for a significantly smaller zeolite content and with a slight increase of pph. Catalyst B is also more active in conversion of the ethylbenzene.

In addition, these results show that the EUO zeolite that is synthesized according to the process of the invention is more selective with a gain of 28% over the net losses in the isomerization reaction of aromatic compounds with 8 carbon atoms.

What is claimed is:

1. A process for preparing an EUO zeolite comprising at least one element X selected from the group consisting of the silicon and germanium and at least one element T selected from the group consisting of aluminum, iron, gallium, boron, titanium, vanadium, zirconium, molybdenum, arsenic, antimony, chromium and manganese, said process comprising synthesizing the zeolite in the presence of a nitrogen-containing organic structuring agent Q, said structuring agent being at least one dibenzyldimethylammonium derivative or a precursor thereof and in the presence of nuclei S of at least one EUO zeolitic material and sufficient X and T so as to provide an EUO zeolite having an X/T ratio of between 7 and 26.

2. A process according to claim 1, wherein the EUO zeolitic nuclei have an X/T ratio of between 5 and 100.

3. A process according to claim 1, wherein the EUO zeolitic nuclei have an X/T ratio of between 7 and 30.

4. A process according to claim 1, wherein the EUO zeolitic nuclei have a size of between 0.001 and 500 $\mu$m.

5. A process according to claim 1, said process comprising forming a mixture in aqueous medium comprising at least one source of at least one element X, at least one source of at least one element T, at least one source of said structuring agent and nuclei S of at least one EUO zeolitic material.

6. A process according to claim 5, the aqueous mixture further comprising at least one salt P of an alkali metal or ammonium.

7. A process according to claim 5, wherein the EUO zeolitic nuclei are introduced at any time in the preparation.

8. A process according to claim 7, comprising homogenizing, at least in part, the aqueous mixture that contains element source X, element source T, and said organic structuring agent, and thereafter adding the EUO zeolitic nuclei.

9. A process according to claim 5, wherein the reaction mixture during the synthesis has the following composition, expressed in oxide form:

| | |
|---|---|
| $XO_2/T_2O_3$ (mol/mol) | 10–100 |
| $OH^-/XO_2$ (mol/mol) | 0.002 to 2.0 |
| $Q/XO_2$ (mol/mol) | 0.002 to 2.0 |
| $Q/(M^+ + Q)$ (mol/mol) | 0.1 to 1.0 |
| $H_2O/XO_2$ (mol/mol) | 1 to 500 |
| $P/XO_2$ (mol/mol) | 0 to 5 |
| $S/XO_2$ (g/g) | 0.0001 to 0.1 , | wherein $M^+$ is an alkaline metal or ammonium ion, and P is an alkaline metal salt or ammonium salt.

10. A process according to claim 5, wherein the reaction mixture during synthesis has the following composition, expressed in oxide form:

| | |
|---|---|
| $XO_2/T_2O_3$ (mol/mol) | 12–70 |
| $OH^-/XO_2$ (mol/mol) | 0.005 to 1.5 |
| $Q/XO_2$ (mol/mol) | 0.005 to 1.5 |
| $Q/(M^+ + Q)$ (mol/mol) | 0.1 to 1.0 |
| $HO/XO_2$ (mol/mol) | 3 to 250 |
| $P/XO_2$ (mol/mol) | 0 to 1 |
| $S/XO_2$ (g/g) | 0.0005 to 0.07, | wherein $M^+$ is an alkaline metal or ammonium ion, and P is an alkaline metal salt or ammonium salt.

11. A process according to claim 5, wherein the reaction mixture during synthesis has the following composition, expressed in oxide form:

| | |
|---|---|
| $XO_2/T_2O_3$ (mol/mol) | 15–60 |
| $OH^-/XO_2$ (mol/mol) | 0.01 to 1 |
| $Q/XO_2$ (mol/mol) | 0.01 to 1 |
| $Q/(M^+ + Q)$ (mol/mol) | 0.1 to 1.0 |
| $H_2O/XO_2$ (mol/mol) | 5 to 100 |
| $P/XO_2$ (mol/mol) | 0 to 0.25 |
| $S/XO_2$ (gig) | 0.001 to 0.04, | wherein $M^+$ is an alkaline metal or ammonium ion, and P is an alkaline metal salt or ammonium salt.

12. A process according to claim 1, wherein element X is silicon and element T is aluminum.

13. A process according to claim 1, further comprising subjecting the resultant EUO zeolite to a final calcination stage.

14. A process according to claim 1, wherein the EUO-zeolitic nuclei is selected from the group consisting of EU-1, TPZ-3, ZSM-50, and the resultant zeolite of said process.

15. A synthesized EUO zeolite prepared according to claim 1.

16. A synthesized EUO zeolite prepared according to claim 3.

17. In the synthesis of zeolites, adding to a reaction mixture an EUO zeolite according to claim 16 as nuclei.

18. A catalyst comprising an EUO zeolite according to claim 15.

19. A catalyst according to claim 18, further comprising at least one binder and at least one metal of group VIII.

20. A catalyst according to claim 19, wherein the zeolite is at least partly in acid form.

21. A catalyst according to claim 19, further comprising at least one metal selected from the group consisting of the elements of groups IB, IIB, IIIA, IVA, VIB and VIIB.

22. A catalyst according to claim 19, further comprising sulfur.

23. A process for the transformation of hydrocarbons comprising contacting a hydrocarbon feedstock with a catalyst according to claim 20.

24. A process according to claim 23, wherein said transformation of hydrocarbons comprises isomerizing an aromatic fraction with 8 carbon atoms.

25. A process according to claim 1, wherein the EUO zeolitic nuclei have an X/T ratio of between 7 and 30.

26. A process according to claim 1, wherein element X is silicon or germanium and element T is aluminum, iron, gallium, boron, titanium, vanadium, zirconium, molybdenum, arsenic, antimony, chromium, or manganese.

27. A catalyst comprising an EUO zeolite prepared according to claim 12, at least one binder and at least one metal of group VIII.

28. A catalyst according to claim 27, wherein the zeolite is at least partly in acid form.

29. A catalyst according to claim 28, further comprising at least one metal selected from the group consisting of the elements of groups IB, IIB, IIIA, IVA, VIB and VIIB.

30. A catalyst according to claim 27, further comprising sulfur.

31. A catalyst according to claim 30, wherein said at least one metal of group VIII is palladium or platinum, said at least one metal selected from the group consisting of the elements of groups IB, IIB, IIIA, IVA, VIB and VIIB is tin or indium, and said binder is alumina.

* * * * *

UNITED STATES PATENT AND TRADEMARK OFFICE
CERTIFICATE OF CORRECTION

PATENT NO.   : 6,616,910 B2
DATED        : September 9, 2003
INVENTOR(S)  : Loic Rouleau et al.

It is certified that error appears in the above-identified patent and that said Letters Patent is hereby corrected as shown below:

<u>Title page,</u>
Item [56], References Cited, OTHER PUBLICATIONS, reads "pp. 483-390" should read -- pp. 483-490 --

<u>Column 18,</u>
Line 18, reads "HO/XO$_2$" should read -- H$_2$O/XO$_2$ --
Line 64, reads "claim 20" should read -- claim 19 --

<u>Column 20,</u>
Line 4, reads "claim 27" should read -- claim 29 --

Signed and Sealed this

Fourteenth Day of September, 2004

JON W. DUDAS
*Director of the United States Patent and Trademark Office*